United States Patent
Nguyen

(10) Patent No.: US 8,670,245 B2
(45) Date of Patent: Mar. 11, 2014

(54) COMMUNICATION CIRCUIT FOR DRIVING A PLURALITY OF DEVICES

(75) Inventor: Quang Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/208,514

(22) Filed: Aug. 12, 2011

(65) Prior Publication Data

US 2011/0299315 A1   Dec. 8, 2011

Related U.S. Application Data

(62) Division of application No. 10/637,247, filed on Aug. 7, 2003, now Pat. No. 8,023,280.

(60) Provisional application No. 60/490,745, filed on Jul. 28, 2003.

(51) Int. Cl.
 *H05K 7/12* (2006.01)

(52) U.S. Cl.
 USPC ..... 361/760; 361/775; 361/803; 257/E23.175

(58) Field of Classification Search
 USPC ............... 361/760, 775, 803, 784, 786, 805; 257/691, 723, E23.175; 365/51, 191
 See application file for complete search history.

(56) References Cited

U.S. PATENT DOCUMENTS

| | | | |
|---|---|---|---|
| 3,671,523 A | 6/1972 | Westphal et al. | |
| 3,905,801 A | 9/1975 | Fawzi | |
| 4,242,525 A | 12/1980 | Kiyoura | |
| 4,247,716 A | 1/1981 | Kiyoura | |
| 4,564,704 A | 1/1986 | Dickore et al. | |
| 4,614,822 A | 9/1986 | Jackman | |
| 4,898,974 A | 2/1990 | Dickore et al. | |
| 5,091,568 A | 2/1992 | Jackman | |
| 5,341,509 A * | 8/1994 | Takashima | 710/317 |
| 5,548,734 A | 8/1996 | Kolinski et al. | |
| 5,966,293 A | 10/1999 | Obermaier et al. | |
| 6,693,801 B2 | 2/2004 | Otsuka | |
| 6,833,618 B2 | 12/2004 | Ono et al. | |
| 2002/0041020 A1 | 4/2002 | Ono et al. | |

FOREIGN PATENT DOCUMENTS

EP    1097917 A1   5/2001

* cited by examiner

*Primary Examiner* — Kenneth Parker
*Assistant Examiner* — Jose R Diaz
(74) *Attorney, Agent, or Firm* — Eric Ho

(57) ABSTRACT

A system and method is provided for transmitting a signal to a plurality of slave devices (e.g., memory devices, etc.) via a communication circuit having a plurality of segments that are substantially equal in length and/or impedance. Specifically, according to one embodiment of the invention, an electronic system includes a processor, a plurality of memory devices, and a communication circuit (i.e., a bus) having a central node and a plurality of segments. Specifically, the plurality of segments are used to connect the plurality of devices (e.g., the processor, the plurality of memory devices) to the central node. For example, the processor is connected to the central node via a primary segment, the first memory device ($M_0$) is connected to the central node via a first segment, etc. In one embodiment of the invention, the plurality of segments are substantially equal in length. In other words, the central node is substantially electrically-equidistant from each memory device. In another embodiment of the invention, the plurality of segments have substantially equal impedances. By arranging the plurality of memory devices in this manner (e.g., substantially electrically-equidistant from the central node, etc.), a well behaved signal can be received at each memory device.

13 Claims, 2 Drawing Sheets

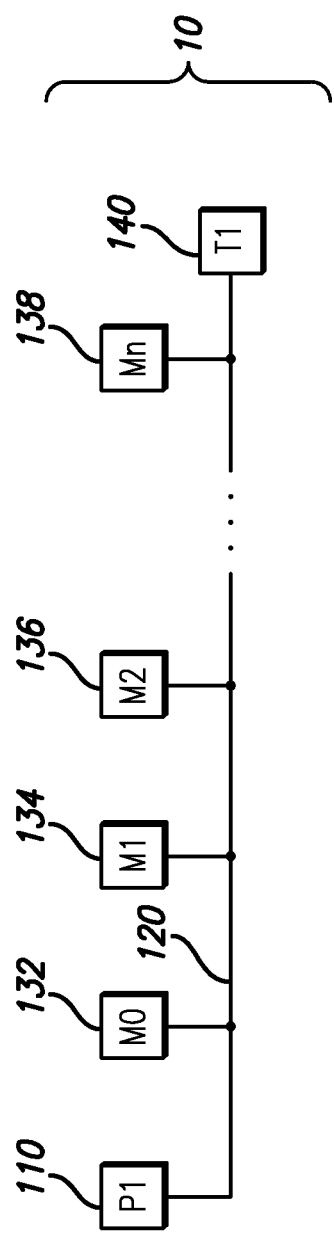
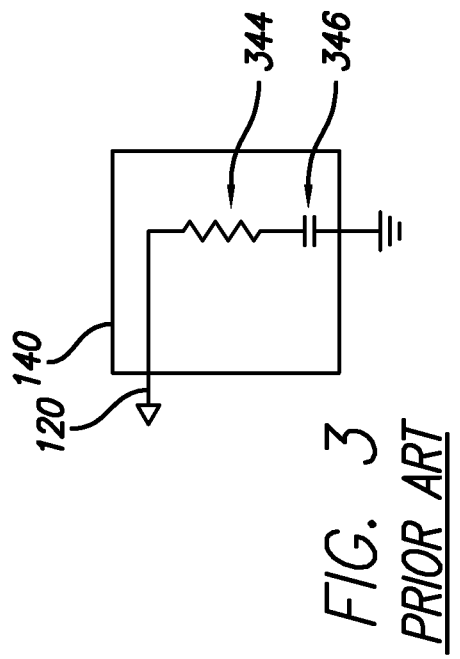
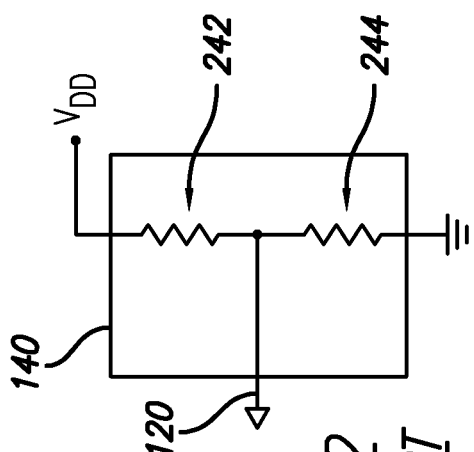

COMMUNICATION CIRCUIT FOR DRIVING A PLURALITY OF DEVICES

RELATED APPLICATIONS

This application is a divisional of 10/637,247 filed on Aug. 7, 2003, titled "COMMUNICATION CIRCUIT FOR DRIVING A PLURALITY OF DEVICES", which also claims priority to U.S. Provisional Ser. No. 60/490,745, filed on Jul. 28, 2003.

BACKGROUND OF THE INVENTION

1. Field of the Invention

The claimed invention relates to a communication circuit for driving a plurality of devices, or more particularly, to a system and method of transmitting a signal to a plurality of slave devices (e.g., memory devices, etc.) via a communication circuit having a plurality of segments that are substantially equal in length and/or impedance.

2. Description of Related Art

As electronic components become cheaper and more readily available, devices that utilize such components (e.g., wireless telephones, personal digital assistants, etc.) become more prevalent. Furthermore, as electronic devices become more prevalent, and competition increases, efforts are typically undertaken to minimize production costs.

One such method of minimizing costs is to minimize real estate (i.e., minimize the size of the electronic circuits located therein). For example, many electronic circuits include a processor and memory devices. In an effort to minimize real estate (i.e., minimize the circuit size), these components are arranged serially. For example, as shown in FIG. 1., the memory devices 132-138 (i.e., slave devices) are arranged serially with respect to the processor 110 (i.e., master device). The processor 110 them communicates (in parallel) with the plurality of memory devices 132-138 via a bus 120.

A drawback with such an arrangement is that the signal received by certain memory devices appears distorted. This is because each memory device (with the exception of the last memory device) receives both the transmitted signal (i.e., the signal transmitted by the processor 110) and a reflected signal (i.e., a signal reflected from the end of the bus, or reflected from the memory device located at the end of the bus). Thus, the signal received by the last memory device 138 ($M_N$) substantially matches the signal transmitted by the processor 110 ($P_1$) (i.e., the signal is substantially well-behaved), whereas the signals received by the remaining memory devices 132-136 appear slightly distorted. In fact, the closer the memory device is to the processor, the more distorted the signal will appear. This is because the time delay between the transmitted signal and the reflected signal is proportional to the signal distortion. In other words, as the time delay increases, so to does the distortion. Thus, the first memory device 132 ($M_0$), which receives the transmitted signal first and the reflected signal last (i.e., experiences the greatest time delay), will receive a signal that is most distorted.

One method of reducing signal-reflection-distortion is through the use of an external termination circuit (i.e., a termination circuit that is external to the processor and the memory devices). Specifically, as shown in FIG. 1, an external termination circuit 140 is placed at the end of the bus 120 in an effort to reduce, or eliminate signal reflection. FIG. 2 provides one example of such an external termination circuit 140. Specifically, the termination circuit 140 includes a plurality of resistors 242, 244 arranged to create a resistor-divider network. In other words, resistor 242 is used to connect the bus 120 to an input voltage ($V_{DD}$) and resistor 244 is used to connect the bus 120 to ground. The resistor-divider network operates to dampen the signal propagated over the bus 120, thereby reducing (or eliminating) the reflection thereof (i.e., signal reflection).

Another external termination circuit 140 is illustrated in FIG. 3. Specifically, the external termination circuit 140 includes a resistor 344 and a capacitor 346 arranged to create an RC circuit. Such a circuit (like the resistor-divider network) operates to dampen the signal when it reaches the end of the bus, thereby reducing, or eliminating any reflection of the signal. It should be appreciated that the term "external termination circuit" is used herein to identify a termination circuit that is external to the master/slave devices, and not a termination circuit that may be internal to the master (or slave) device.

The drawbacks of using an external termination circuit, however, is that it increases the electronic circuit's size, expense, and power consumption—all of which are undesirable characteristics. For example, with respect to FIG. 2, power is continuously drawn, and therefore wasted, through the two resistors 242, 244 (i.e., from $V_{DD}$ to ground). Therefore, it would be advantageous to be able to reduce (or substantially eliminate) signal-reflection-distortion without having to use an external termination circuit.

SUMMARY OF THE INVENTION

The claimed invention provides a system and method of transmitting a signal to a plurality of slave devices (e.g., memory devices, etc.) via a communication circuit having a plurality of segments that are substantially equal in length and/or impedance. Embodiments of the invention operate in accordance with at least one master device (e.g., a processor, etc.), a plurality of slave devices (e.g., memory devices, etc.) and a transmission circuit (i.e., bus) including a central node and a plurality of segments. Specifically, the plurality of segments are used to connect the plurality of devices (i.e., the master/slave devices) to the central node. For example, a master device is connected to a central node via a primary segment, a first slave device is connected to the central node via a first segment, etc.

In one embodiment of the invention, the plurality of segments are substantially equal in length (e.g., the central node is substantially electrically-equidistant from each slave device, etc.). For example, in this embodiment, the length of the first segment is substantially the same length as the second segment, which is substantially the same length as the third segment, etc. By arranging the plurality of memory devices in this manner (i.e., substantially electrically-equidistant from the central node), a well behaved signal can be received at each memory device, without requiring the use of an external termination circuit.

In another embodiment of the invention, the plurality of segments are substantially equal in impedance. For example, in this embodiment, the impedance of the first segment is substantially the same as the impedance of the second segment, which is substantially the same as the impedance of the third segment, etc.

A more complete understanding of the system and method of transmitting a signal to a plurality of slave devices (e.g., memory devices, etc.) via a communication circuit having a plurality of segments that are substantially equal in length and/or impedance will be afforded to those skilled in the art, as well as a realization of additional advantages and objects thereof, by a consideration of the following detailed descrip-

BRIEF DESCRIPTION OF THE DRAWINGS

FIG. 1 illustrates a prior art transmission system including an external termination circuit.

FIG. 2 illustrates one embodiment of the termination circuit depicted in FIG. 1.

FIG. 3 illustrates another embodiment of the termination circuit depicted in FIG. 1.

DETAILED DESCRIPTION OF THE PREFERRED EMBODIMENT

The claimed invention provides a system and method of transmitting a signal to a plurality of slave devices (e.g., memory devices, etc.) via a communication circuit having a plurality of segments that are substantially equal in length and/or impedance. In the detailed description that follows, like element numerals are used to describe like elements illustrated in one or more figures.

Embodiments of the invention operate in accordance with at least one master device and a plurality of slave devices. It should be appreciated that while these embodiments are described in terms of a processor (i.e., a master device) and a plurality of memory devices (i.e., slave devices), the claimed invention is not so limited, and can be used in conjunction with any master/slave devices generally known to those skilled in the art. It should further be appreciated that while these embodiments are described in terms of a master device communicating with a plurality of slaves, the claimed invention is not so limited. Thus, for example, a slave device communicating with (e.g., transmitting a well-behaved signal to) a master device and/or other slave devices is within the spirit and scope of the claimed invention.

Figure 4:
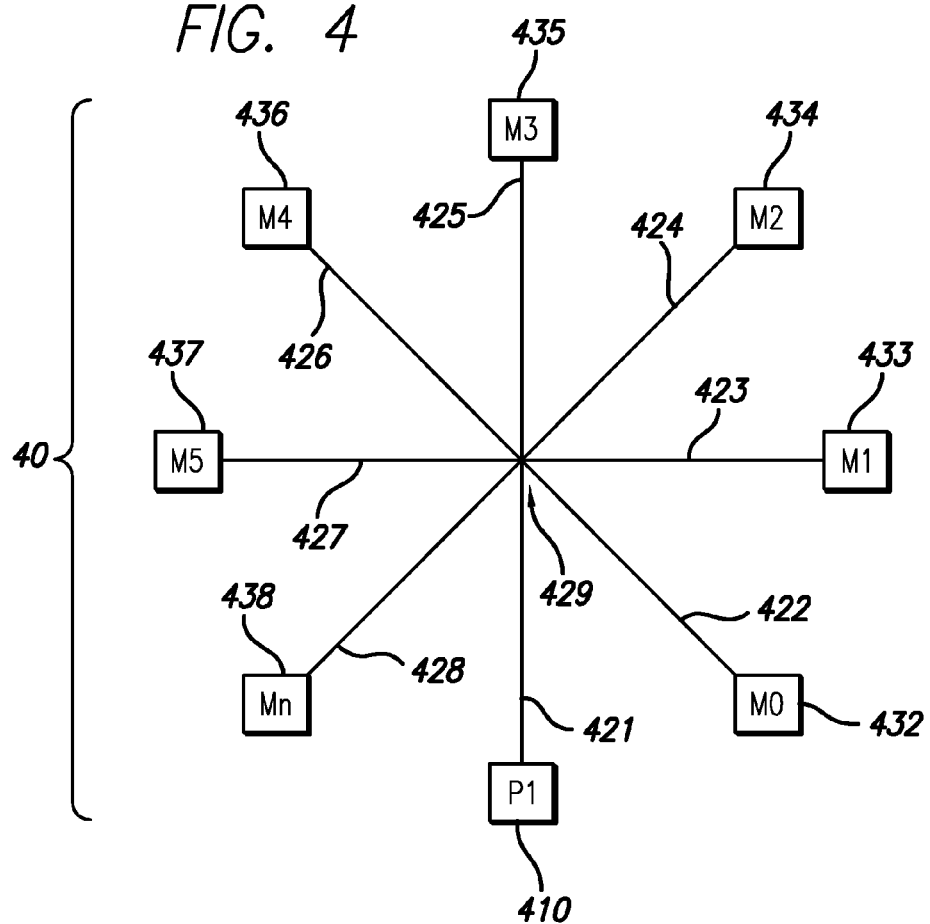
FIG. 4 illustrates a transmission system operating in accordance with one embodiment of the invention.

One embodiment of the invention is illustrated in FIG. 4. Specifically, an electronic system 40 is shown, including a processor 410 and a plurality of memory devices 432-438 adapted to communicate via a bus having a central node 429 and a plurality of segments (e.g., 421, 422, etc.). It should be appreciated that the processors depicted herein (e.g., 410, 510) include, but are not limited to, microprocessors, application specific integrated circuits (ASICs), programmable integrated circuits, and all other computational devices generally known to those skilled in the art. It should further be appreciated that the memory devices depicted herein (e.g., 432, 433, 535, etc.) include, but are not limited to, cache memory, flash memory, SRAM, SDRAM, EPROM, EEPROM, RAM, ROM, and all other synchronous and asynchronous memory devices known to those skilled in the art. It should also be appreciated that the segments depicted herein include, but are not limited to wires, traces (e.g., PCB traces, flex-board traces, etc.), and all other conductive materials known to those skilled in the art.

Referring back to FIG. 4, the plurality of segments (e.g., 421, 422, etc.) are used to connect the plurality of devices (i.e., the processor and each memory device) to the central node 429. For example, the processor 410 is connected to the central node 429 via a primary segment 421, the first memory device 432 ($M_0$) is connected to the central node 429 via a first segment 422, the second memory device 433 ($M_1$) is connected to the central node 429 via a second segment 423, etc.

In one embodiment of the invention, the plurality of segments are substantially equal in length. In other words, the central node is substantially electrically-equidistant from each memory device and the processor. For example, the length of the first segment 422 is substantially the same length as the second segment 423, which is substantially the same length as the third segment 424, etc. In another embodiment of the invention, the plurality of segments are further substantially equal in impedance. For example, the impedance of the first segment 422 is substantially the same as the impedance of the second segment 423, etc.

By arranging the plurality of memory devices in this manner (e.g., substantially electrically-equidistant from the central node, etc.), a well behaved signal can be received at each memory device. Furthermore, if the processor's output impedance matches the impedance of the bus (i.e., the impedance of the plurality of segments), then the signal received by each memory device will be substantially similar to the signal transmitted by the processor (i.e., a well behaved signal). It should be appreciated that the number and/or location of components depicted in FIG. 4 are not intended to limit the claimed invention, but are merely provided to illustrate the environment in which embodiments of the invention may operate. Thus, for example, an electronic system having additional processors, fewer memory devices, and/or memory devices arranged differently (e.g., non-radially, etc.) is within the spirit and scope of the claimed invention. It should further be appreciated that, while embodiments of the invention can be used to transmit a substantially well-behaved signal to a plurality of slave devices, the integrity of this signal may be affected if the transmission line is too long (e.g., there are too many branches, or slaves) or the driving impedance of the master device does not match the impedance of the transmission line.

Figure 5:
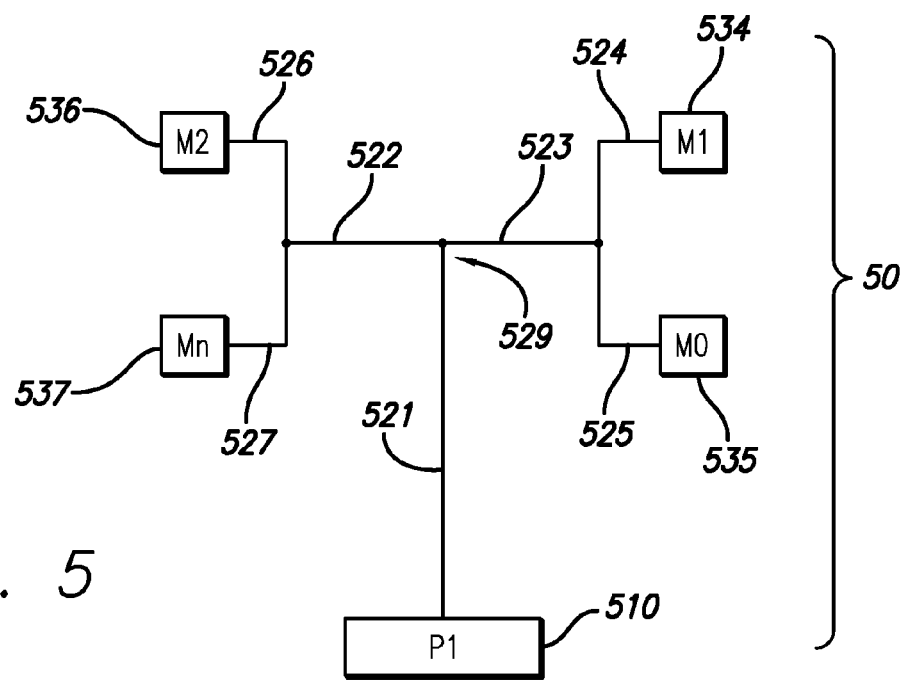
FIG. 5 illustrates a transmission system operating in accordance with another embodiment of the invention.

Another embodiment of the invention is shown in FIG. 5. Specifically, an electronic system 50 is illustrated, including a processor 510 and a plurality of memory devices 534-537 adapted to communicate via a bus, including a central node 529 and a plurality of segments (e.g., 521, 522/526, etc.). The plurality of segments are used to connect the plurality of devices (i.e., the processor and each memory device) to the central node 529. For example, the processor 510 is connected to the central node 529 via a primary segment 521, the first memory device 535 ($M_0$) is connected to the central node 529 via a first segment 523/525, the second memory device 534 ($M_1$) is connected to the central node 529 via a second segment 523/524, etc.

In one embodiment of the invention, the plurality of segments are substantially equal in length. In other words, the central node is substantially electrically-equidistant from each memory device. For example, the length of the first segment 523/525 is substantially the same length as the second segment 523/524, which is substantially the same length as the third segment 522/526, etc. In another embodiment of the invention, the plurality of segments are further substantially equal in impedance. It should be appreciated that the plurality of segments in this embodiment may partially overlap one another. For example, the segment connecting the central node 529 to the first memory device 535 ($M_0$) may partially overlaps the segment connecting the central node 529 to the second memory device 534 ($M_1$) (i.e., portion 523 is common to these two segments). Thus, as long as the electrical paths between a common node and multiple slave devices are equal in length and/or impedance, the objects of the claimed invention are realized.

Having thus described preferred embodiments of a system and method for transmitting a signal to a plurality of slave devices via a communication circuit having a plurality of segments that are substantially equal in length and/or impedance, it should be apparent to those skilled in the art that certain advantages of the system have been achieved. It should also be appreciated that various modifications, adaptations, and alternative embodiments thereof may be made within the scope and spirit of the claimed invention. The invention is further defined by the following claims.

What is claimed:

1. A circuit to communicate a signal to a plurality of memory devices such that the signal as received by a first one of the plurality of memory devices is substantially the same as the signal as received by a second one of the plurality of memory devices, the circuit comprising:
    a central node located substantially electrically-equidistant from each one of said plurality of memory devices;
    a plurality of memory segments to connect said plurality of memory devices to said central node, wherein each one of said memory segments is associated with an impedance that is substantially the same; and
    a processor segment to connect a processor with said central node, wherein said processor segment has a length that is substantially equal to a respective length of each one of said plurality of memory segments.

2. The circuit of claim 1, wherein said processor segment is associated with an impedance that is substantially equal to the impedance associated with each one of said plurality of memory segments.

3. The circuit of claim 1, wherein said plurality of memory segments comprises a plurality of traces on a circuit board.

4. The circuit of claim 1, wherein said plurality of memory segments extends substantially radially from said central node.

5. The circuit of claim 1, wherein said first one of said plurality of memory segments connects a first one of said plurality of memory devices to said central node and partially overlaps said second one of said plurality of memory segments, said second one of said plurality of memory segments connecting a second one of said plurality of memory devices to said central node.

6. An apparatus comprising:
    a plurality of memory devices;
    means for communicating a signal to each of said plurality of memory devices;
    a central node located substantially electrically-equidistant from each of said plurality of memory devices;
    a plurality of memory segments connecting the plurality of memory devices to said central node, wherein each of said memory segments is associated with an impedance that is substantially the same; and
    a processor segment connecting said means for communicating to said central node, wherein said processor segment has a length that is substantially equal to a respective length of each of said plurality of memory segments,
    wherein a signal as received by a first of said plurality of memory devices is substantially similar to the signal as received by each of the others of said plurality of memory devices.

7. The apparatus of claim 6, wherein said processor segment is associated with an impedance that is substantially equal to the respective impedance of each of said plurality of memory segments.

8. A method comprising:
    arranging a plurality of memory interfaces and a processor interface on a printed circuit board (PCB);
    arranging a plurality of memory traces on said PCB to connect said plurality of memory interfaces to a central node such that each one of said plurality of memory traces is substantially equal in length;
    arranging a processor trace on said PCB to connect said processor interface to said central node, wherein said processor trace has a length that is substantially equal to a respective length of each one of the plurality of memory traces; and
    connecting a plurality of memory devices to said plurality of memory interfaces; and
    connecting a processor to said processor interface.

9. The method of claim 8, wherein each one of said plurality of memory traces is associated with a respective impedance that is substantially equal to a respective impedance of each of the others of said plurality of memory traces.

10. The method of claim 9, wherein said processor trace is associated with an impedance that is substantially equal to the respective impedance of each one of the plurality of memory traces.

11. The method of claim 8, wherein said plurality of memory traces extends substantially radially from said central node.

12. The method of claim 8, wherein said plurality of memory traces and said processor trace extend substantially radially from said central node.

13. The method of claim 8, wherein s a first one of said plurality of memory traces connecting a first one of said plurality of memory interfaces to said central node partially overlaps a second one of said plurality of memory traces connecting a second one of said plurality of memory interfaces to said central node.

* * * * *